Aug. 14, 1951  E. ESSON  2,564,525
COOK STOVE

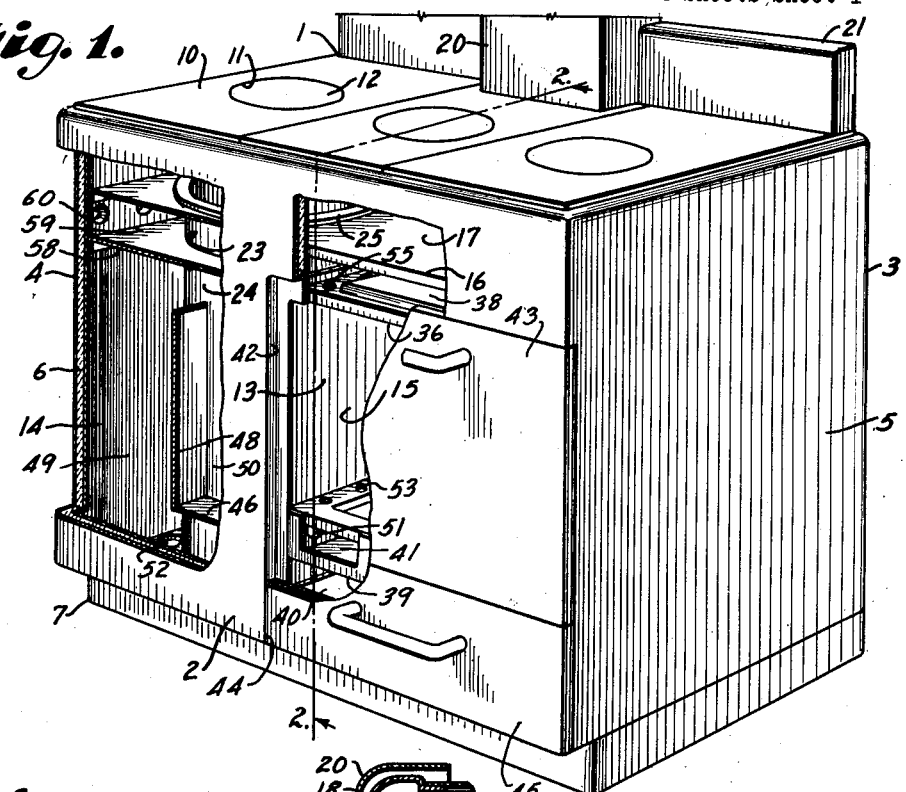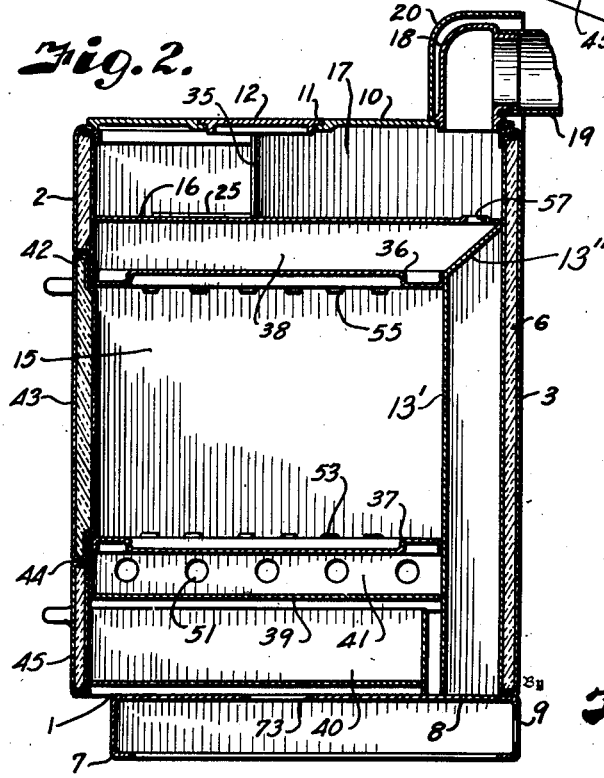

Filed July 15, 1946  4 Sheets-Sheet 2

Inventor
Edwin Esson
By Fishburn & Mullendore
Attorneys

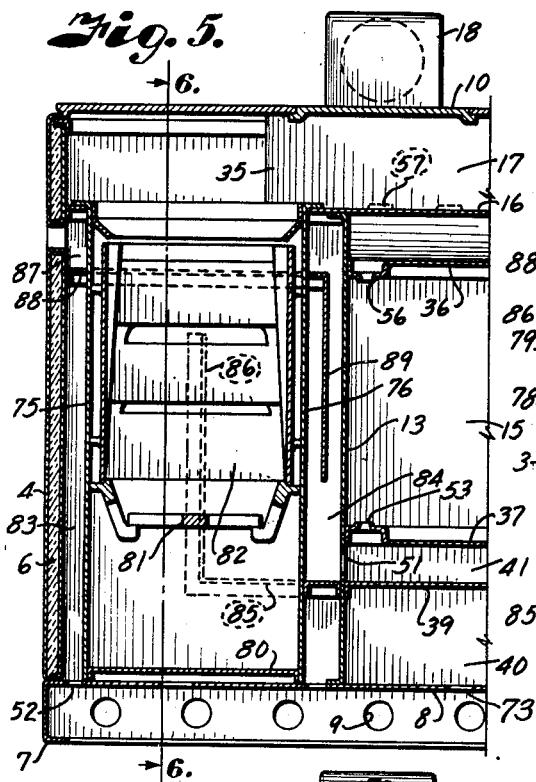

Aug. 14, 1951     E. ESSON     2,564,525
COOK STOVE
Filed July 15, 1946     4 Sheets-Sheet 4
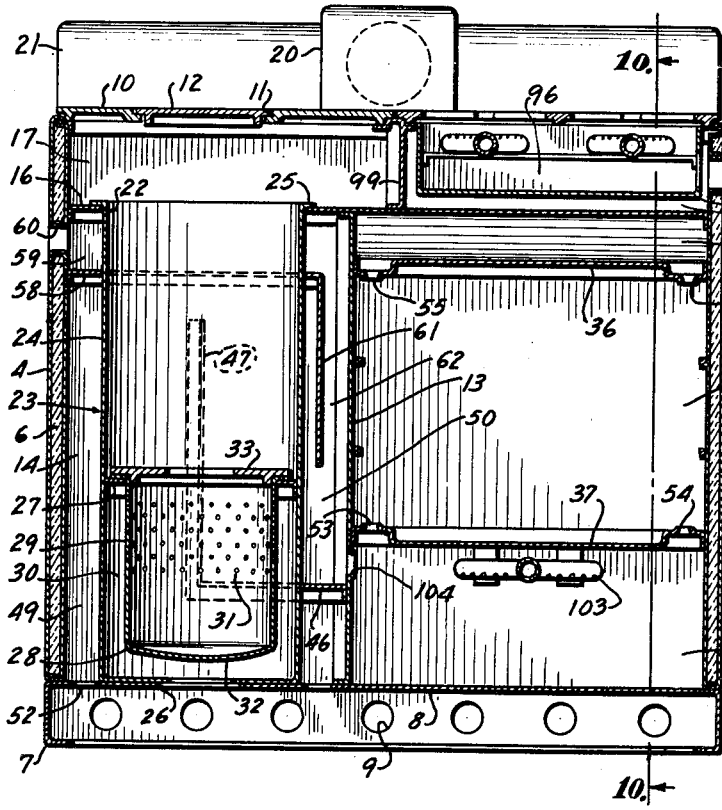
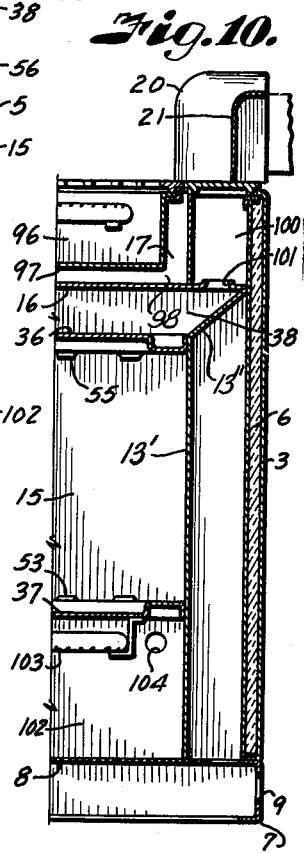
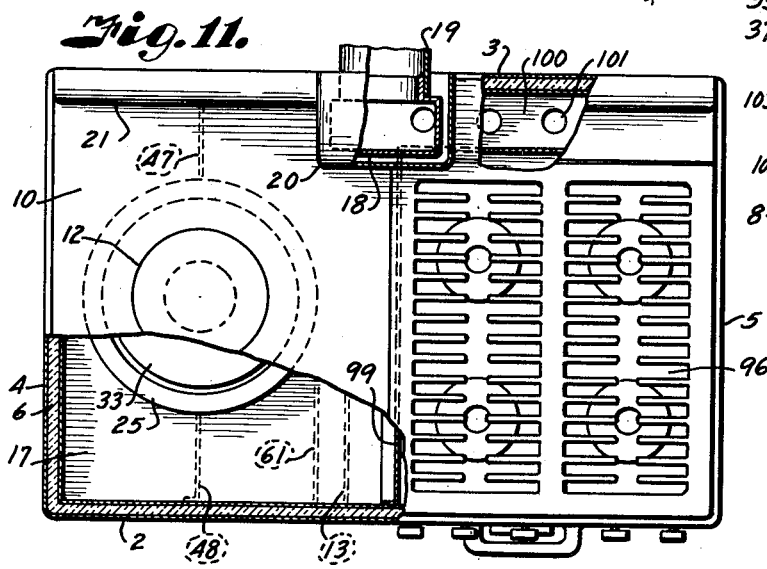
Inventor
Edwin Esson.
By Fishburn & Mullendore
Attorneys Patented Aug. 14, 1951

2,564,525

UNITED STATES PATENT OFFICE 2,564,525

COOK STOVE

Edwin Esson, Kansas City, Mo., assignor to Locke Stove Company, Kansas City, Mo., a corporation of Missouri Application July 15, 1946, Serial No. 683,590

3 Claims. (Cl. 126—1)

This invention relates to stoves and particularly to cooking stoves which include a cooking top and an oven heated by products of combustion evolved within a common combustion chamber.

Heretofore it has been the practice in such stoves to heat the cooking top by passing the products of combustion thereunder in a substantially direct course to the flue outlet and to heat the oven by diverting the products of combustion around the walls thereof before discharge through the flue outlet. This arrangement has been unsatisfactory because it is not possible to maintain the required temperature of the cooking top and at the same time maintain the desired oven temperatures. It has also been difficult to effect the distribution and travel of the hot gases about the walls of the oven so as to obtain substantially uniform baking temperatures within all portions of the oven. Another difficulty has been that in many installations the draft differential is not sufficient to maintain proper combustion and the required circulation of the products of combustion when using the oven for baking purposes. This arrangement is also not adaptable to the use of liquid fuels.

Such stoves also involve complicated passageways and systems of dampers in an attempt to maintain even oven temperatures. Another difficulty is that the passageways around the oven accumulate soot and require continuous cleaning to keep the stove in operation.

The present invention overcomes these difficulties by providing a cook stove structure wherein the products of combustion are at all times caused to travel directly under the cooking top to the flue outlet so as to maintain the desired cooking top temperatures, and to provide for heating of the oven by circulating air about the combustion chamber and passing the heated air directly through the oven at the proper oven temperature.

Other objects of the invention are to provide a cooking stove wherein the heated air is circulated through the oven responsive to the draft differential between the inner and outer sides of the combustion chamber; to provide for tempering the heated air passed through the oven by introducing a flow of cool air in volume to maintain predetermined oven temperatures to suit various baking requirements; and to provide a structure suitable for the use of solid and liquid fuels alone or in combination with gas and/or electricity.

In accomplishing these and other objects of the invention, I have provided improved cooking stove structures illustrated in the accompanying drawings wherein:

Fig. 1 is a perspective view of a cook stove constructed in accordance with a preferred form of the present invention and equipped for burning a liquid hydrocarbon fuel.

Fig. 2 is a cross section through the oven portion of the stove on the line 2—2 of Fig. 1.

Fig. 5 is a vertical section through one side of a cook stove constructed in accordance with the present invention and equipped for burning a solid fuel.

Fig. 6 is a cross section through the combustion chamber on the line 6—6 of Fig. 5.

Fig. 7 is an enlarged section through an automatic regulator for admitting tempering air into the flow of oven air and which may be used in conjunction with the stove equipped for burning liquid fuel or the stove equipped for burning solid fuel.

Fig. 8 is a vertical section through the combustion chamber side of a stove constructed in accordance with the present invention and showing a reverse circulation of heated air through the oven.

Fig. 9 is a vertical section similar to Fig. 3 but showing a combination stove for using both liquid and gaseous fuels.

Fig. 10 is a fragmentary vertical section on the line 10—10 of Fig. 9.

Fig. 11 is a plan view of the combination stove shown in Figs. 9 and 10, parts of the top being broken away to better illustrate the construction.

Figure 3:
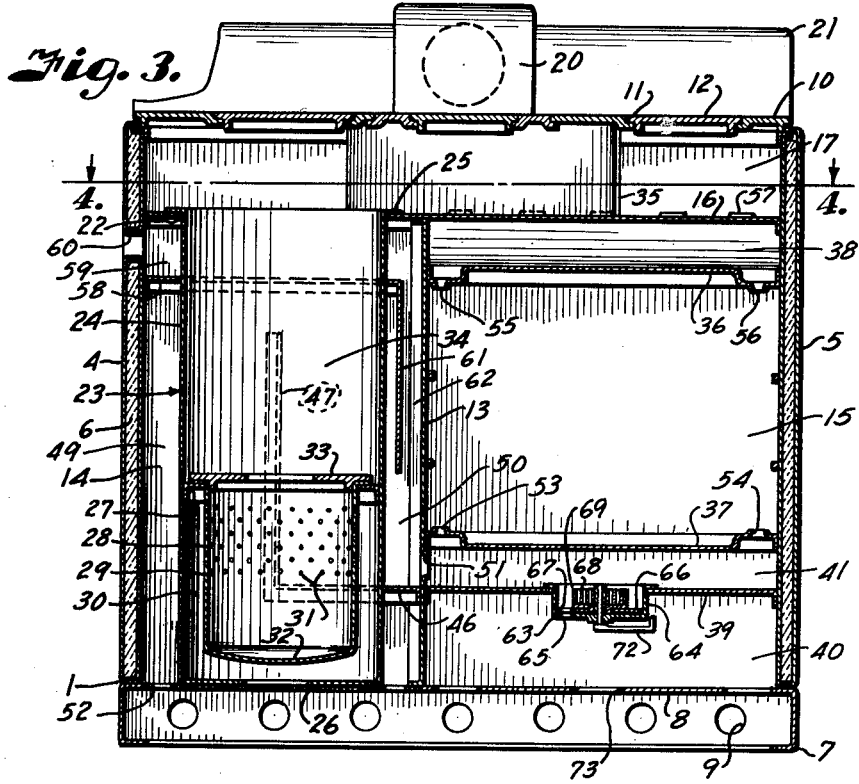
Fig. 3 is a vertical section through the stove taken at right angles to the section illustrated in Fig. 2 and showing the combustion and oven chambers and the air flow passageways through which heated air is circulated for bringing the oven to baking temperatures.

Referring more in detail to the drawings:

1 designates a cook stove or range constructed in accordance with the present invention and which includes front and rear walls 2 and 3 and side walls 4 and 5 that are preferably provided with insulation 6 to retain the heat evolved within the stove. The stove also includes a base 7 having a top 8 on which the walls of the stove are supported, the rear of the base having air inlet openings 9 for admitting combustion supporting air to a heating unit later described. The top of the stove includes a cooking top 10 having openings 11 closed by lids 12 through which heat from the hot products of combustion is conducted to the cooking vessels placed thereover when the stove is in use. Extending transversely between the side walls 4 and 5 and extending from the front wall 2 to the rear wall 3 is a partition 13 dividing the interior of the stove into a heating compartment 14 and an oven compartment 15. The upper portion of the partition 13 connects with a horizontal partition 16 spaced below the cooking top to provide a passageway 17 for hot products of combustion that are caused to travel to a flue outlet connection 18 that is adapted to be connected by a duct 19 with a chimney or other vent (not shown). The outlet 18 has connection with the passageway 17 through the cooking top and is enclosed by a cover 20 finished in accordance with the sides of the stove and which is incorporated into the rail 21 extending along the back of the cooking top. The partition 16 extends entirely across the space between the side walls and from the front wall to the back wall and is provided over the heating compartment 14 with an opening 22 in which is suspended the heating unit 23.

In the illustrated instance the heating unit 23 includes a substantially cylindrical casing 24 having an outwardly turned peripherial flange 25 at its upper end for seating upon the partition 16 and having its lower end seated upon the base top 8. The top 8 of the base has an opening 26 coaxial with the casing 24 and which has connection with the air inlet openings 9 for admitting combustion supporting air into the casing. Attached to the inner face of the casing 24 at a suitable distance above the bottom thereof is a ledge-like ring 27 for supporting a burner pot 28 of standard type which includes an annular wall 29 spaced inwardly from the wall of the casing 24 to provide an annular passageway 30 for flow of combustion supporting air for distribution through a plurality of apertures 31 that are provided in the wall 28. The bottom 32 of the pot is dished downwardly to contain a body of liquid fuel that is fed into the pot from a source of supply as in usual practice. The top of the burner pot carries a high fire ring 33 for directing the flame resulting from combustion of the fuel to the center of the combustion chamber 34 for flow in heat exchange contact with the casing wall 24 and for discharge through the passageway 17 to heat the cooking top 10.

Figure 4:
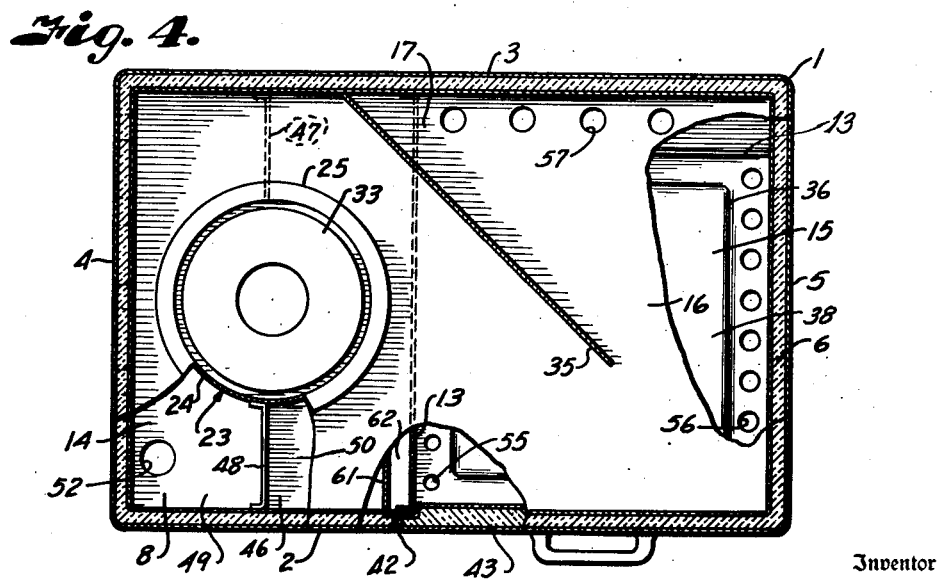
Fig. 4 is a horizontal section through the stove at a point directly below the cooking top and taken on the line 4—4 of Fig. 3, a part of the partition forming the bottom of the passageway for the hot products of combustion being broken away to show the heated air outlets in the top of the oven.

In order to retard flow of hot products of combustion into the cooking top to the flue outlet, the compartment 17 is provided with a baffle 35 that extends from the rear wall at a point spaced from the side wall 4 and which extends diagonally toward the front and side wall 5 as best shown in Fig. 4. The hot products of combustion are thus caused to move along the baffle toward the front and side of the stove opposite the heating unit for discharge through the flue outlet, thereby directing the flow so as to maintain desired temperatures throughout the cooking top.

The top and bottom of the oven compartment 15 is formed by upper and lower horizontal partitions 36 and 37 entirely closing the space between the partition 13 and side wall 5 and from the front wall 2 to the rear wall 3. The upper partition 36 is spaced below the partition 16 to provide a horizontal passageway 38 over the top of the oven and the lower partition 37 is spaced above a horizontal partition 39 of a compartment 40 to form a passageway 41 under the oven compartment and above the compartment 40. The partitions 37 and 39 also extend from the partition 13 to the side wall 5 and from the front wall to the rear wall 13' of the oven compartment 15, the wall 13' being spaced inwardly from the rear wall 3 and the space closed from the passageway 38 by an inclined extension 13" of the wall 13. The front wall 2 is provided in registry with the oven chamber with a door opening 42 closed by a door 43.

The bottom of the compartment 40 is formed by the top 8 of the base 7. The front of the stove also has an opening 44 in registry with the compartment and closed by a door 45. The casing 24 of the heating unit is spaced from the corresponding walls of the casing and from the partition 13 to provide a space therearound which is divided into air passageways as now to be described.

Extending from the partition 13 to substantially half the width of the heating chamber is a horizontal partition 46 located substantially in plane with the partition 39 and which is connected with the casing 24 and with vertical partitions 47 and 48 to divide the heating chamber into an upflow passageway 49 and a downflow air passageway 50 that are interconnected across the tops of the partitions 47 and 48. Heated air is discharged from the downflow passageway into the passageway 41 under the oven through openings 51 in the partition 13 as best shown in Fig. 3. Air is admitted to the heating chamber from the space within the base 7 through openings 52 in the base top 8, the openings being located in the respective corners of the heating chamber. The heated air is discharged from the passageway 41 upwardly within the sides of the oven through rows of orifices 53 and 54 for discharge through similar orifices 55 and 56 into the passageway 38 from which the air is drawn through openings 57 that are provided in the partition 16 along the rear wall of the stove responsive to draft effected by the pressure differential required to burn the fuel at a given burning rate.

Attention is directed to the fact that the temperature of the air delivered to the oven remains substantially constant but varies with change in burning rate of the fuel so that when hotter oven temperatures are required, fuel flow to the burner pot is increased which results in a hotter fire and a correspondingly higher temperature of the air circulated through the oven. The side of the oven formed by the partition 13 may tend to overheat since it is located adjacent the combustion chamber and to avoid this possibility, the upper portion of the heating chamber above the terminal edges of the partitions 47 and 48 is provided with a partition 58 spaced below the partition 16 to provide a passageway 59 completely around the upper portion of the combustion chamber so that cool air may be admitted thereinto through openings 60 provided in the side wall 4 as shown in Fig. 3. One side of the partition 58 terminates short of the partition 13 and terminates in a downwardly extending portion 61 that is spaced from the partition 13 to form a passageway 62 discharging into the downflow passageway for intermixing the flows of heated air. The air admitted through the openings 60 is heated by the upper portion of the combustion chamber but the volume admitted is sufficient so that the air moving down the passageway 62 prevents overheating of the wall 13 through radiation from the combustion chamber of the heating unit.

In order to maintain predetermined baking temperature within the oven, I provide a regulator for admitting unheated air into the stream of heated air in an amount sufficient to maintain a fixed uniform temperature of the air delivered to the oven. This is effected by providing a regulator 63 which may be located, for example, on the partition 39 and which includes a housing 64 having a plurality of openings 65 arranged in arcuate series within the partition 39. Located within the housing 64 and operable over the openings 65 is a damper 66 having an arcuate opening 67 which in one position of the damper permits air to pass through all of the openings for maximum flow of cool air into the oven. The opposite side of the damper acts as a valve for covering the openings in other positions of the damper to regulate the flow of cool air to that required for maintaining desired oven temperatures. The damper is automatically actuated by means of a bimetal thermostat coil 68 contained in a housing 69 and in contact with air admitted to the oven. One end 70 of the thermostat is anchored to the housing 69 and the opposite end to a shaft 71 of the damper 66. The thermostat 68 may be adjusted by a lever 72. Air is admitted to the compartment 40 for passage through the openings 65 from within the base by providing the top of the base with suitable openings 73.

In using the cooking top without heating the oven, the automatic regulator 63 may be set by manipulation of the lever 72 to admit sufficient flow of cool air through the oven to maintain the required draft in the flue outlet for a given burning rate of the fuel; consequently, little or no air will be drawn through the heating chamber passageways. The products of combustion on rising into the passageway 17 are distributed under the cooking top and finally flow through the flue outlet.

When the oven is to be used, the regulator 63 is set to maintain a predetermined temperature. Consequently, the air flow through the regulator will be reduced to effect flow through the passageways of the heating chamber. The air to be heated is drawn through the air inlets 9 of the base responsive to the draft and pass through the openings 52 for movement through the upflow passage in contact with the hot surfaces at one side of the combustion chamber, across the top of the partitions, and down the opposite side of the combustion chamber for discharge through the openings 51 to the distributing passageway 41 below the oven and wherein the hot air mixes with the cool air and the tempered air is discharged into the oven through the orifices 53 and 54 to provide the oven heat. The air is discharged from the oven through the orifices 55 and 56 into the collection passageway 38 from where the air is to be withdrawn through the openings 57 into the passageway 17 for discharge through the flue outlet 18. Air will also be drawn through the openings 60 to the upper horizontal passage 59 for movement downwardly alongside the partition 13 so as to avoid overheating of the partition by direct radiation from the wall of the combustion chamber. As the oven approaches the set temperature the thermostat brings the air flow through the regulator into balance with the air moving through the heating chamber to maintain the set temperature.

With this arrangement the desired temperature of the cooking top may be maintained while maintaining a predetermined lower oven temperature for baking purposes, since I am enabled to control the temperatures of the air admitted to the oven independently of the temperature of the cooking top.

The form of the invention shown in Figs. 5 and 6 contemplates a heating unit capable of burning a solid fuel. In this instance the heating unit includes side walls 75 and 76 spaced inwardly from the side wall 4 and from the partition 13 and front and rear walls 77 and 78 spaced from the front and rear walls 2 and 3 of the stove to provide space 79 sufficient for the flow of air to be heated. Carried between the walls of the heating unit and spaced upwardly from a bottom 80 is a grate 81. Carried above the grate 81 is a fuel magazine 82, of suitable type for supporting fuel that is burned in a fuel bed carried on the grate to heat the walls of the heating unit.

The space 79 surrounding the heating unit is divided into an upflow passageway 83 and a downflow passageway 84 by horizontal and vertical partitions 85 and 86 corresponding to the partitions 46, 47 and 48 above described. The top of the space surrounding the heating unit above the partitions 85 and 86 is divided into an air inlet passageway 87 by a partition 88 having a depending portion 89 within the downflow passageway 84 adjacent the partition 13 so that a flow of air is maintained along the side of the oven wall to avoid overheating of the adjacent side of the oven through radiation from the wall of the heating unit. The oven portion of the stove is constructed in the same manner as that of the stove illustrated in Figs. 1 to 4 inclusive.

The modified form of stove shown in Fig. 8 conforms with the structure of the stove illustrated in Figs. 1 to 4 inclusive with the exception that the air heated by the heating unit is discharged through openings 90 into a horizontal passageway 91 above the oven from which the heated air is distributed through orifices 92 in a downward flow through the oven and discharge through similar orifices 93 located in the bottom of the oven, the spent air being collected by a lower horizontal passageway 94 having outlets 95 in the rear portion thereof which open into a passageway that connects with the flue outlet.

In Figs. 9 to 11 inclusive, I have illustrated my invention as applied to a combination stove utilizing both liquid and gas fuels. In this instance, a burner compartment 96 is provided within the passageway 17 under the cooking top 19 by suspending a pan 97 within a compartment 98 formed by partitioning the space under the cooking top with a transverse partition 99 as shown in Fig. 9. The compartment in which the pan 97 is supported terminates short of the rear wall to provide a space 100 therebetween which is connected with the passageway over the oven through openings 101. Suspended from the bottom of the oven within a grill space 102 is a gas burner 103 for supplying heat to the oven when the fuel burning equipment is not in use. The fuel burning unit and passageways in the heating chamber are the same as in the first described form of the invention. The heated air is discharged from the down flue passageway into the space 102 for upward flow through the oven openings 104. When the liquid fuel burning heating unit is in operation the stove functions in the same manner as the first described stove, the heated air being discharged through the oven responsive to draft differential. When the gas burners are to be used they are operated in conventional manner to heat the oven or the overlying portion of the cooking top.

From the foregoing it is obvious that I have provided a stove structure wherewith the desired temperature may be maintained for the cooking top and at the same time maintain the required oven temperatures. The structure also permits uniform baking temperature in all portions of the oven. It is also obvious that the stove is of simple and inexpensive construction and is entirely free of the customary passageways for the flow of products of combustion which bring about the difficulties above pointed out.

What I claim and desire to secure by Letters Patent is:

1. A cook stove including an oven, a cooking top, a heating unit, means for passing products of combustion from the heating unit in heating contact with the cooking top and having a vent directly connected therewith for maintaining draft through the heating unit, means forming an air heating duct in heat exchange relation with the heating unit and having an air inlet for air to be heated and an outlet for heated air, means forming a duct connecting the air outlet with the oven for conducting heated air to the oven, and means responsive to temperature of the heated air for admitting cool air into said connecting duct for modifying temperature of the heated air prior to delivery into the oven, said oven having an outlet directly into the passageway for products of combustion for effecting movement of air through the heating duct into the connecting duct and through the heat responsive means into the oven responsive to said draft.

2. A cook stove including a casing having front, rear and side walls, a cooking top carried by said walls, a partition extending across the casing below the cooking top to form a passageway for hot products of combustion to a flue outlet in direct connection with said passageway, a partition extending transversely of the housing and connected with the first-named partition for dividing the remaining portion of the housing into an air heating compartment and an oven compartment, partitions extending across the top and bottom of the oven compartment to provide a passageway having an inlet connection with the oven and an outlet connection with said passageway under the cooking top, a passageway having inlet connection with the heating compartment and an outlet connection with the oven compartment whereby air is drawn into the heating compartment and through said oven responsive to said draft, a heating unit supported in the air heating compartment to heat said air and supply products of combustion to heat the cooking top, and means for admitting another supply of air to said passageway below the oven for admitting relatively cool air into the oven responsive to said draft to temper the heated air prior to passage into the oven.

3. A cook stove including a casing having front, rear and side walls, a cooking top carried by said walls, a partition extending across the casing below the cooking top to form a passageway for hot products of combustion to a flue outlet in direct connection with said passageway, a partition extending transversely of the housing and connected with the first-named partition for dividing the remaining portion of the housing into an air heating compartment and an oven compartment, partitions extending across the top and bottom of the oven compartment to provide a passageway having an inlet connection with the oven and an outlet connection with said passageway under the cooking top, a passageway having inlet connection with the heating compartment and an outlet connection with the oven compartment whereby air is drawn into the heating compartment and through said oven responsive to said draft, a heating unit supported in the air heating compartment to heat said air and supply products of combustion to heat the cooking top, means for admitting another supply of air to said passageway below the oven for admitting relatively cool air into the oven responsive to said draft to temper the heated air prior to passage into the oven, and a thermostat for controlling one of said air supplies.

EDWIN ESSON.

REFERENCES CITED

The following references are of record in the file of this patent:

UNITED STATES PATENTS

| Number | Name | Date |
|---|---|---|
| 90,850 | Keep | June 1, 1869 |
| 125,377 | Burke | Apr. 9, 1872 |
| 181,634 | Burke | Aug. 29, 1876 |
| 866,168 | Van Buren | Sept. 17, 1907 |
| 1,757,987 | Whittier | May 13, 1930 |
| 2,143,640 | Agricola | Jan. 10, 1939 |
| 2,330,495 | Karges | Sept. 28, 1943 |
| 2,417,842 | Sanford et al. | Mar. 25, 1947 |